Jan. 24, 1961 C. J. WHEELER 2,968,978

VISE

Filed March 2, 1959 2 Sheets-Sheet 1

INVENTOR
CHARLES J. WHEELER

BY C T Cross
ATTORNEY

INVENTOR
CHARLES J. WHEELER

BY C T Cross
ATTORNEY 2,968,978

VISE

Charles J. Wheeler, 2048 W. Jackson St., Painesville, Ohio

Filed Mar. 2, 1959, Ser. No. 796,701

2 Claims. (Cl. 81—19)

This invention relates to a new and improved chain type pipe vise, and more particularly relates to a novel chain type pipe vise having a self-tightening action.

In general, prior chain type pipe vises comprise a pipe-supporting base member having a length of sprocket gear type chain connected thereto with separate means to draw the chain tight about a pipe laid on the base member, e.g., a handle which tightens the chain as it is twisted or otherwise manipulated. The chain of such prior vises comprises matched pairs of inner and outer links connected by transverse pins. Such chains are well known and are sometimes referred to as sprocket gear chains.

While prior chain type pipe vises have been widely used, they generally tend to suffer from the disability of slippage in use unless extreme pressure is applied. Moreover, the problem of slippage frequently is increased as the chain tends to wear as it is used. Thus, in use, it often requires application of a high degree of pressure to prevent turning of the pipe to be gripped in the vise.

Accordingly, the principal object of this invention is to provide a novel chain type pipe vise which avoids the difficulties heretofore encountered.

A further object of the invention is the provision of a new and improved pipe vise with self-tightening action.

These and other objects and advantages of the invention will more fully appear from the following description thereof.

Broadly, the apparatus of this invention comprises a base member having operatively-secured thereto a nonextensible chain comprising at least one pressure-applying element pivotally or oscillatably journalled transversely and eccentrically on the chain. More specifically, a pipe vise of this invention comprises, in combination, a pipe-supporting base member, a flexible, non-extensible chain including at least one pressure-applying element secured thereon eccentrically, and means on said base to engage and tighten the chain about a pipe disposed on the base.

Referring now to the accompanying drawing.

Figure 1:
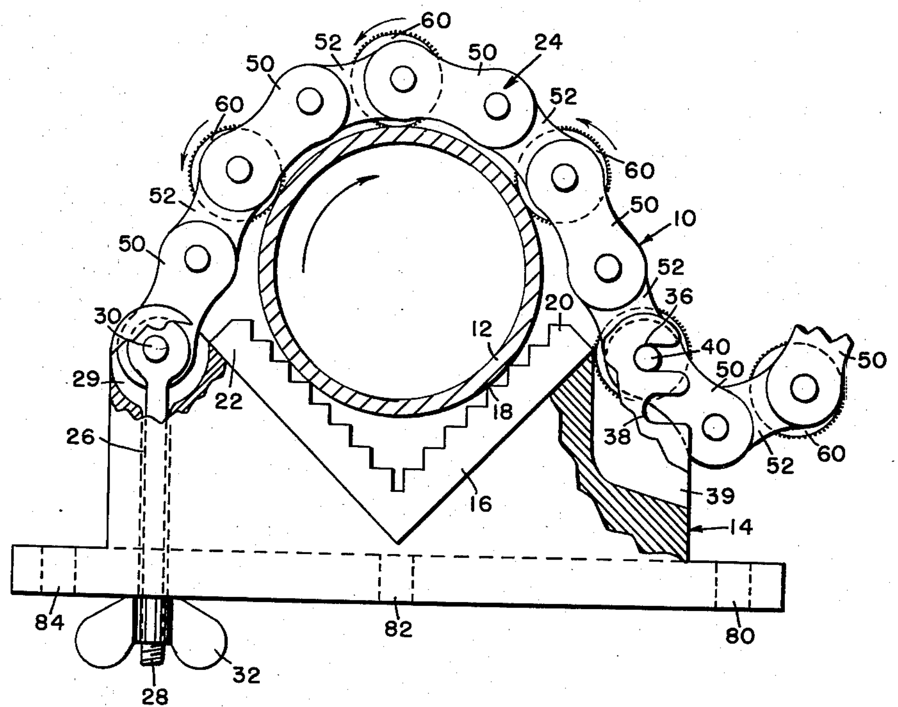
Fig. 1 is an elevational view, partially in section, illustrating a chain type pipe vise of this invention.

Referring more particularly to the drawings in Fig. 1 there is shown at 10, a pipe vise of this invention disposed in operative position about a pipe 12. As there shown, the vise comprises, in combination, a chain 24 which is described in detail hereinafter, and a base or support, designated generally at 14, including a V-shaped pipe support or lower jaw 16 provided with parallel, machined step-like edges 18 adapted to minimize pipe slippage.

Secured adjacent the ends 20 and 22 of the V-support is the chain 24. The chain 24 is engaged at one end to an upstanding support element 26 via an eye bolt 28, and transverse pin 30. The eye bolt 28 is held in a vertical opening 29 having an enlarged top by a wing nut 32 threadedly engaging the lower end thereof.

At the opposite side of the V-support 16, the chain 24 is secured via a transverse pin 40 in detents or recesses 36 or 38, thereby disposing the chain in a U-shaped opening 39, the excess chain thus being guided out of the way.

The construction of the chain 24 constitutes an important part of the invention. As shown in Figs. 1–4, it comprises a suitable length, i.e., at least sufficient to reach around the pipe or other article to be engaged in the vise, of outer elements or links 50 and inner elements or links 52 connected by transverse pins 54. Journalled oscillatably and eccentrically on every other pin 54 is a pressure wheel 60 having a knurled or otherwise roughened surface. The wheels 60 shown are circular, but need not be, and are disposed with their shaft or journal, i.e., pins 54 off-center whereby an eccentric movement of the wheel as it oscillates is obtained.

Figure 2:
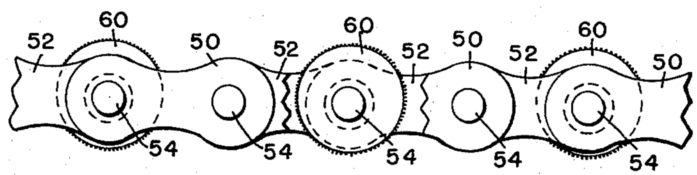
Fig. 2 is an enlarged elevational, fragmentary view of a chain of this invention.
Figure 3:
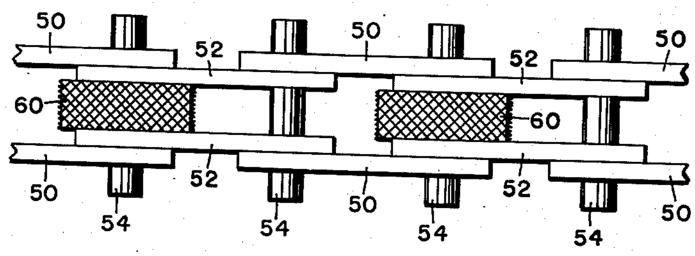
Fig. 3 is a fragmentary plan view of the chain illustrated in Fig. 2.
Figure 4:
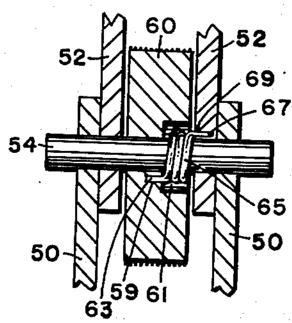
Fig. 4 is an enlarged view, partially in section, of a portion of the chain of this invention, illustrating means for resiliently biasing a pressure-applying element of the chain in a predetermined position.
Figure 5:
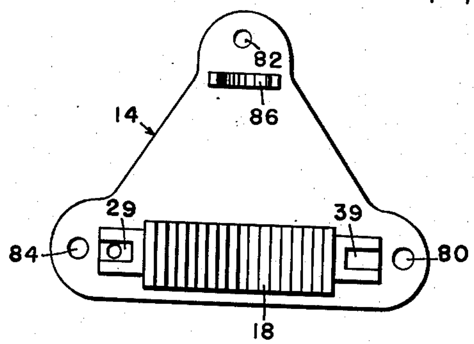
Fig. 5 is a plan view, with parts broken away for clarity, of the base of the pipe vise shown in Fig. 1.

In order to obtain the maximum mechanical advantage, the wheels 60 are desirably resiliently biased in the position shown in Fig. 2, i.e., with a minimum initial downward projection. This is preferably accomplished, as shown in Fig. 4, by a spring 65 disposed about the pins 54 carrying wheels 60. As there shown, the wheels 60 are provided with central circular recessed portion 61 of a depth and diameter sufficient to accommodate the spring 65. One end 63 of the spring 65 is engaged in a further opening 59 in the wheel 60 and the other end 67 is engaged in an opening 69 in the inner link 52. Thus, it will be appreciated that the spring resilience tends normally to maintain the wheel 60 in a desired relationship to the chain when no pressure is applied in order to maintain the wheels 60 in a position for optimum mechanical advantage.

The operation of the vise can best be explained by reference to Fig. 1. As there shown, a pipe 12 is laid on the pipe support 16 and chain 24 arranged over the pipe and the free ends of closest pin 54, e.g., pin 40 in this case, are engaged in detent or recess 36. The wing nut 32 is then tightened. At this time, application of turning pressure to the pipe 12 in a clockwise direction causes the wheels 60 to turn in a counterclockwise direction as they roll against the pipe. It will be appreciated that as this happens the eccentricity of the wheel mounting causes a cam-like action greatly increasing the pressure applied to the pipe 12. Hence, it will be understood that a self-tightening action is involved, i.e., the greater the clockwise pressure applied to the pipe 12, the greater the resultant pressure applied by the wheels 60.

In order to loosen the pipe, the pipe can be turned in the opposite direction whereupon the wheels 60 rotate into a more withdrawn position thereby reducing the pressure. The wing nut 32 is then easily loosened enough to disengage pin 40 and the pipe can be removed.

It will be appreciated that the vise is operable equally well in either direction, i.e., with the pipe turned in a clockwise or counterclockwise direction since in either event the eccentric action of the wheels 60 is effective.

It will be understood that the various apparatus elements can be formed of any suitable high strength material, e.g., tool steel, malleable cast iron, alloy steel, forged steel, or the like.

It is to be understood that, although the invention has been described with specific reference to particular embodiments thereof, it is not to be so limited since changes and alterations therein may be made which are within the full intended scope of this invention as defined by the appended claims.

I claim:

1. A pipe vise comprising, in combination, a base member, a flexible, nonextensible chain secured thereto at one end, means to engage the chain about a pipe at a point on the chain dictated by the size of the pipe, means to tighten the chain when disposed about a pipe, said chain carrying a plurality of spaced, curved, pressure-applying elements resiliently biased in a predetermined position and journalled off center whereby attempted turning of the pipe in the vise generates a self-tightening action.

2. A device for gripping a cylindrical body, comprising in combination, an engageable member against which said cylindrical body may be positioned, a flexible and substantially non-extensible chain having first and second portions, first engaging means to engage said first portion of said chain for anchoring said first portion to said engageable member, second engaging means to engage said second portion of said chain wrapped around said cylindrical body for anchoring said second portion to said engageable member, one of said engaging means including means to tighten the chain about said cylindrical body, said chain having a plurality of transverse pin means spaced apart from each other in a peripheral direction about said cylindrical body, circular pressure wheels journaled off-center on said respective pins and providing a minimum radius gripping position and a maximum radius gripping position with said cylindrical body on diametrically opposite sides of said pins, rotation of said wheels on said pins upon attempted relative movement between the cylindrical body and said chain generating a self-tightening action as the wheels tend to rotate from a minimum radius gripping position towards a maximum radius gripping position, and resilient means engaging said wheels to normally bias them in a predetermined gripping position with said cylindrical body.

References Cited in the file of this patent

UNITED STATES PATENTS

| | | |
|---|---|---|
| 640,084 | Bohner | Dec. 26, 1899 |
| 1,145,560 | Corder | July 6, 1915 |
| 1,412,708 | Richardson | Apr. 11, 1922 |
| 2,498,582 | Schoenberger | Feb. 21, 1950 |
| 2,603,994 | Norton | July 22, 1952 |